United States Patent [19]
Magner et al.

[11] Patent Number: 5,736,633
[45] Date of Patent: Apr. 7, 1998

[54] METHOD AND SYSTEM FOR DECODING OF VCT/CID SENSOR WHEEL

[75] Inventors: Stephen William Magner, Lincoln Park; Christopher Cyril Mann, Northville; Kenneth Roy Butts, Grosse Pointe Woods, all of Mich.

[73] Assignee: Ford Global Technologies, Inc., Dearborn, Mich.

[21] Appl. No.: 784,882

[22] Filed: Jan. 16, 1997

[51] Int. Cl.[6] .................................................. G01M 15/00
[52] U.S. Cl. ............................................. 73/116; 701/101
[58] Field of Search .................................. 73/116, 117.2, 73/117.3; 123/419, 436; 364/431.03, 431.07, 431.08

[56] References Cited

U.S. PATENT DOCUMENTS

| | | | |
|---|---|---|---|
| 3,992,930 | 11/1976 | Back et al. | 73/117.3 |
| 4,043,189 | 8/1977 | Tedeschi | 73/117.3 |
| 4,338,903 | 7/1982 | Bolinger | 123/476 |
| 4,378,004 | 3/1983 | Petrie | 123/643 |
| 4,788,956 | 12/1988 | Suzuki et al. | 73/116 |
| 5,070,726 | 12/1991 | Fukui et al. | 75/116 |
| 5,165,271 | 11/1992 | Stepper et al. | 73/116 |
| 5,209,202 | 5/1993 | Maurer et al. | 123/414 |
| 5,245,968 | 9/1993 | Kolias et al. | 123/414 |
| 5,433,108 | 7/1995 | Sawada | 73/117.3 |
| 5,460,134 | 10/1995 | Ott et al. | 123/476 |
| 5,493,496 | 2/1996 | James et al. | 364/431.04 |
| 5,497,748 | 3/1996 | Ott et al. | 123/414 |
| 5,548,995 | 8/1996 | Clinton et al. | 73/116 |

*Primary Examiner*—George M. Dombroske
*Attorney, Agent, or Firm*—Peter Abolins; Roger L. May

[57] ABSTRACT

A method and system are provided for distinguishing a cylinder identification (CID) signal pulse from camshaft timing signal pulses in a variable cam timing (VCT) engine having multiple engine combustion events. The method includes generating multiple signal pulses including a signal pulse which identifies an engine cylinder and a signal pulse for each one of the multiple engine combustion events. The method also includes measuring a first time period between a first signal pulse and a second signal pulse, measuring a second time period between the second signal pulse and a third signal pulse, and determining that the third signal pulse is the cylinder identification signal pulse if a product of the second time period and a scaling factor fails to exceed the first time period. A specially designed VCT/CID signal generator, and an appropriately programmed microprocessor are provided for performing the method.

16 Claims, 3 Drawing Sheets

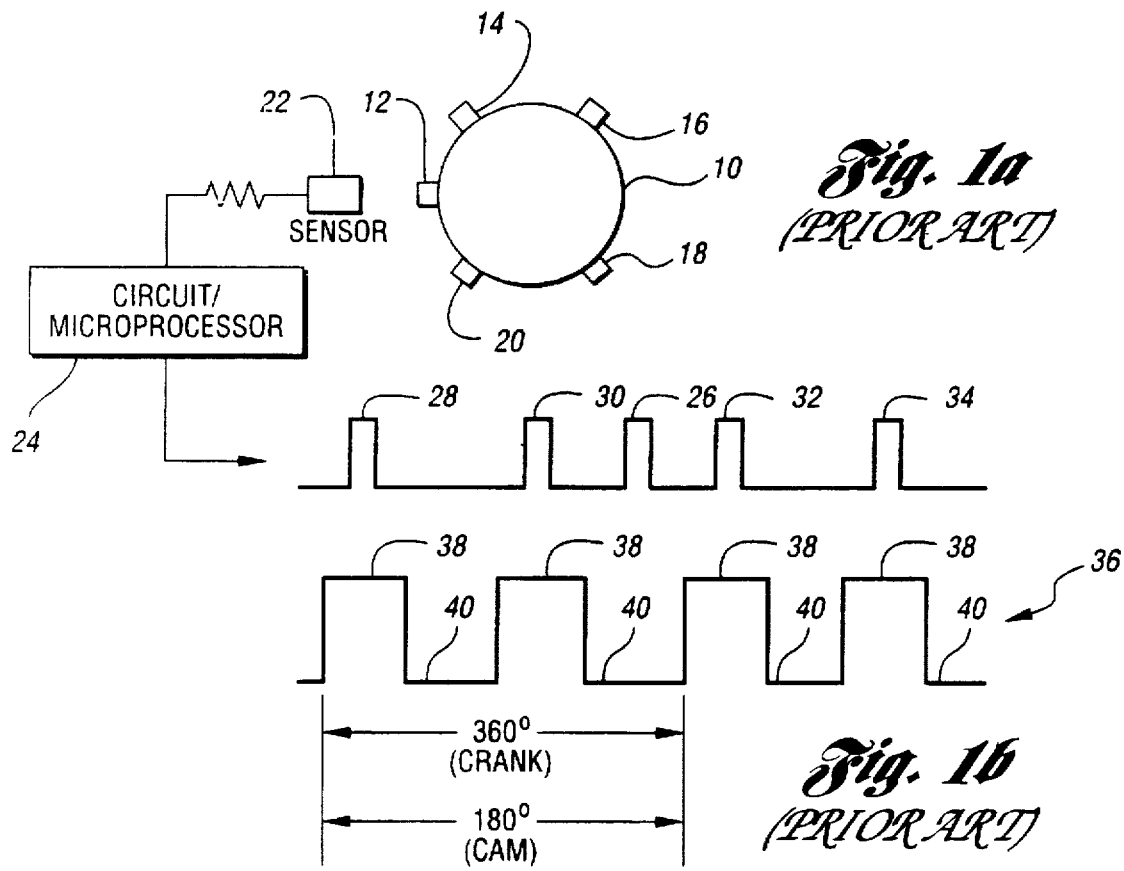
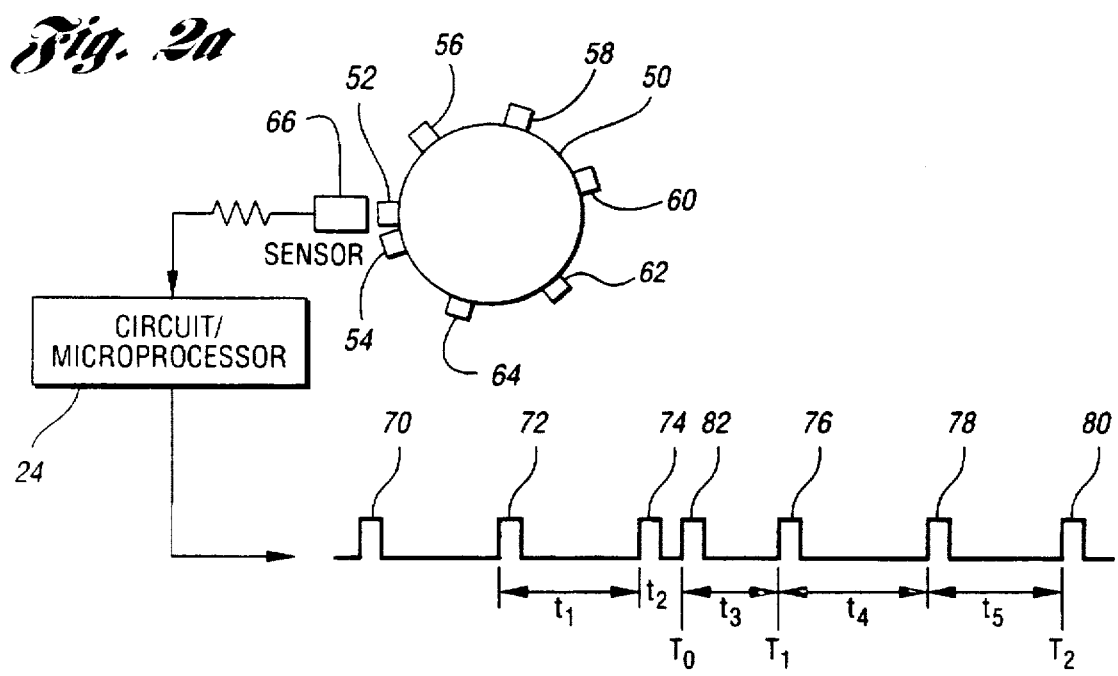

5,736,633

METHOD AND SYSTEM FOR DECODING OF VCT/CID SENSOR WHEEL

TECHNICAL FIELD

This invention relates to a time-based method and system for decoding signal pulses from a variable cam timing/cylinder identification (VCT/CID) sensor wheel.

BACKGROUND OF THE INVENTION

It is well known that variable cam timing (VCT) equipped engines offer a variety of benefits over the fixed timing of valve events that exist in ordinary engines. More specifically, by eliminating the tradeoff established by such fixed timing, VCT allows for optimizing high-end performance, idle stability, emissions, and fuel economy.

One method of altering the valve timing in a VCT system is to rotate the camshaft relative to the crankshaft, which introduces a phase difference therebetween. In that regard, a phase difference of approximately 50-60 degrees is necessary to provide the benefits described above. However, such rotation must be accomplished promptly and accurately and must reject engine shaking disturbances and fluctuations in the VCT actuation system power source (usually a hydraulic pump, such as the engine lubrication system).

To introduce such a phase difference, the engine controller manipulates the VCT actuator. For such manipulation to be effective, the VCT system requires feedback of the actual position of the camshaft relative to the crankshaft. One prior art method of measuring the phase shift is to compare the relative positions of sensor wheels located on the crankshaft and on the camshaft. Such sensor wheels are provided with tabs, the passage of which are recorded by the engine control microprocessor in order to determine cam phase.

To save money, in a VCT-equipped engine the camshaft sensor wheel serves two purposes. First, the wheel is provided with multiple tabs for the VCT measurement. Second, the sensor wheel is also provided with a single tab for cylinder identification (CID), which allows the ignition and fuel systems to operate. Simple and effective methods are provided to properly distinguish between the two types of tabs.

In engines with more than four cylinders, however, such methods either limit VCT operating range or the rate at which VCT position information can be acquired/updated. In turn, range limitations hinder the performance/fuel economy/emissions benefits previously described. Moreover, limitations on the acquisition/update rate of VCT position information hinder the promptness and accuracy of the positioning system.

Thus, there exists a need for an improved method and system for distinguishing a VCT tab from a CID tab. Such an improved method and system would avoid the range and position information limitations described above.

SUMMARY OF THE INVENTION

Accordingly, it is the principle object of the present invention to provide an improved method and system for decoding signal pulses from a variable cam timing/cylinder identification (VCT/CID) sensor wheel.

According to the present invention, then, a method and system are provided for distinguishing a cylinder identification signal pulse from a plurality of camshaft timing signal pulses in a variable cam timing engine having a plurality of engine combustion events. The method of the present invention comprises generating a plurality of signal pulses including a signal pulse which identifies an engine cylinder and a signal pulse for each one of the plurality of engine combustion events. The method further comprises measuring a first time period between a first signal pulse and a second signal pulse, measuring a second time period between the second signal pulse and a third signal pulse, and determining that the third signal pulse is the cylinder identification signal pulse if a product of the second time period and a scaling factor fails to exceed the first time period.

The system of the present invention for distinguishing a cylinder identification (CID) signal pulse from a plurality of camshaft timing signal pulses in a variable cam timing (VCT) engine having a plurality of engine combustion events comprises a VCT/CID signal generator for generating a plurality of signal pulses including a signal pulse which identifies an engine cylinder and a signal pulse for each one of the plurality of engine combustion events. The system further comprises a controller for measuring a first time period between a first signal pulse and a second signal pulse, measuring a second time period between the second signal pulse and a third signal pulse, and determining that the third signal pulse is the cylinder identification signal pulse if a product of the second time period and a scaling factor fails to exceed the first time period.

These and other objects, features, and advantages will be readily apparent upon consideration of the following detailed description in conjunction with the accompanying drawings.

BRIEF DESCRIPTION OF THE DRAWINGS

FIG. 1a is a prior art VCT/CID sensor wheel for use in a 4-cylinder engine;

FIG. 1b is a graphical representation of a prior art VCT/CID signal pulse train in relation to a crankshaft signature signal;

FIG. 2a is a VCT/CID sensor wheel for use in a 6-cylinder engine according to the method and system of the present invention;

FIG. 2b is a graphical representation of a VCT/CID signal pulse train according to the method and system of the present invention;

DETAILED DESCRIPTION OF THE INVENTION

Figures 3A, 3B, 3C, 3D:
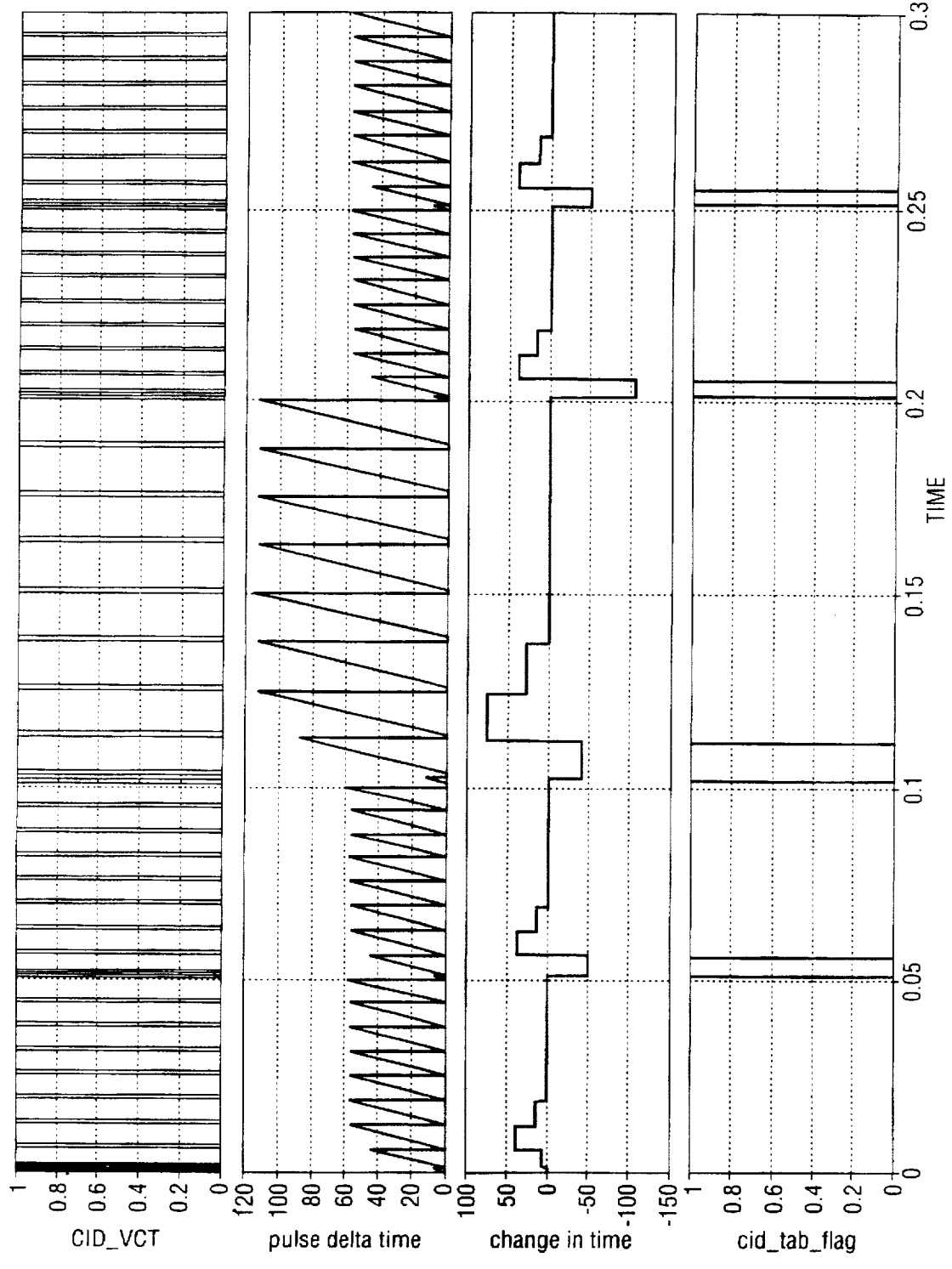
FIGS. 3a-d are graphical representations of operation of the method and system of the present invention for a steady state engine speed, a maximum allowed engine acceleration, and a maximum allowed engine deceleration.
Figure 4A:
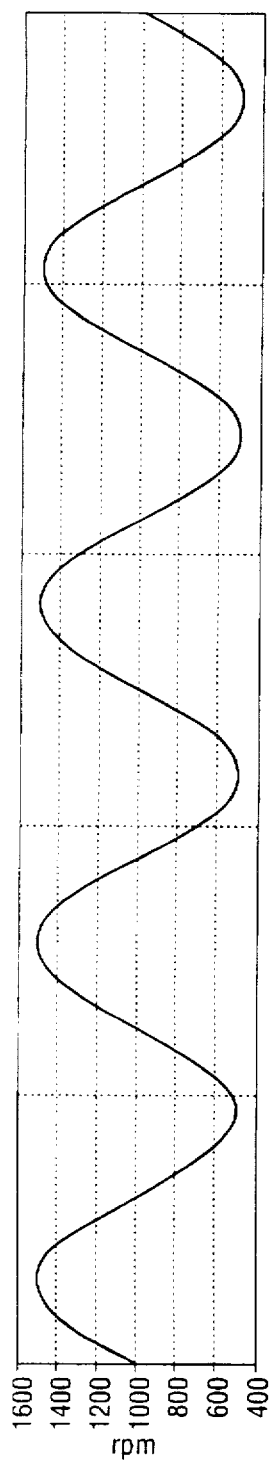
FIGS. 4a-d are graphical representations of operation of the method and system of the present invention for a severely rolling engine speed.
Figure 4B:
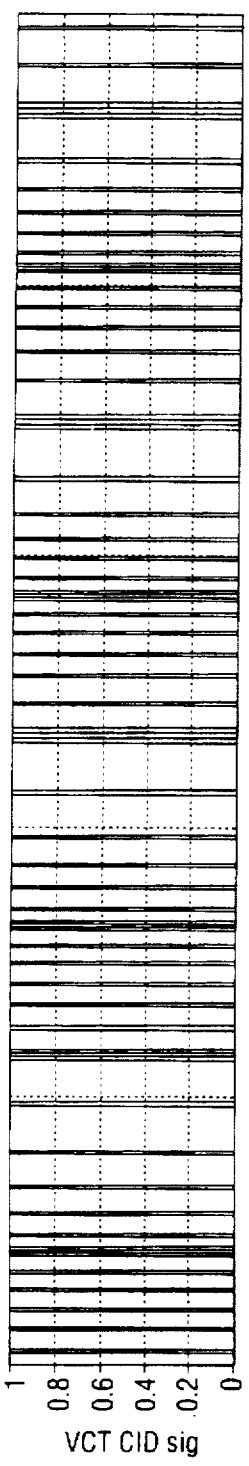
Figure 4C:
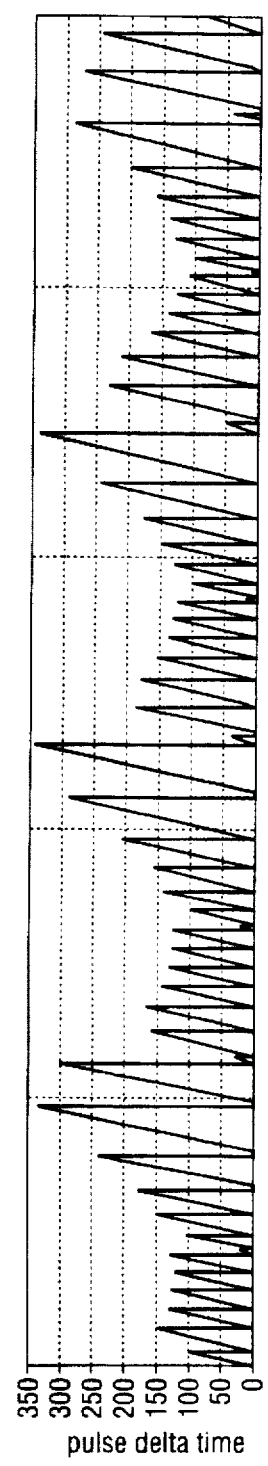
Figure 4D:
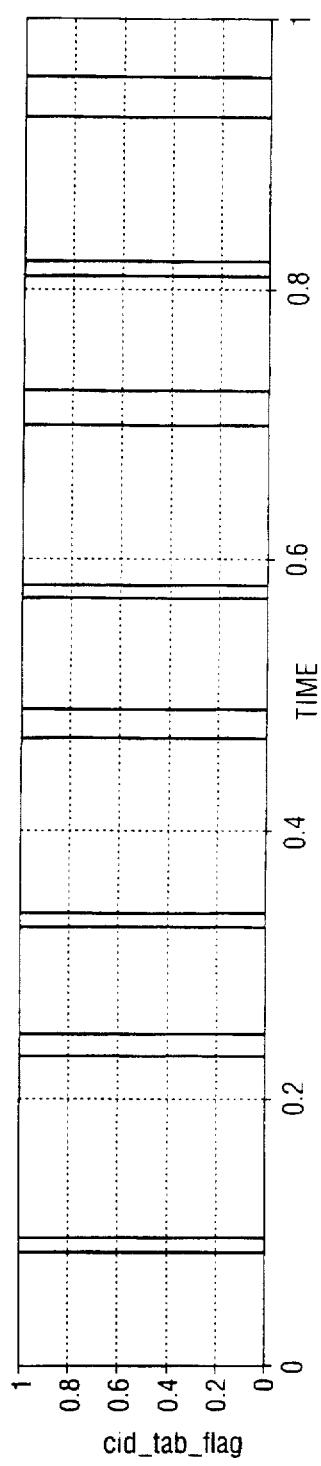

As is well known in the art, present VCT/CID detection systems rely on camshaft rotation relative to the crankshaft. In the dual sensor wheel systems described above, the camshaft relative rotation must be restricted to the time period in which an engine combustion event takes place. In the single sensor wheel systems, however, to properly distinguish between VCT tabs and the CID tab located on the same wheel, the restriction is one-half of an engine event time period.

In the single sensor wheel systems previously described, VCT tabs are distinguished from the CID tab in one of two different ways. The first method is appropriate for an in-line 4-cylinder engine and the second method is appropriate for a 6 or 8-cylinder engine.

Referring now to FIG. 1a, a prior art VCT/CID sensor wheel for use in a 4-cylinder engine is shown. As seen therein, a sensor wheel (10) is provided with a single tab (12) for CID, and four other tabs (14, 16, 18, 20) for VCT position (one for each cylinder). A pickup sensor (22) and a circuit/microprocessor (24) produce a signal pulse for each pass of CID tab (12) and a VCT tab (14, 16, 18, 20). VCT tabs (14, 16, 18, 20) are spaced equidistant from each other. To minimize error in the production of signal pulses, CID tab (12) is located equidistant between two VCT tabs (14, 20).

Referring next to FIG. 1b, a graphical representation is shown of a VCT/CID signal pulse train produced by sensor wheel (10) in relation to a crankshaft signature signal. A signal pulse (26) produced by the CID tab is distinguished from a signal pulse (28, 30, 32, 34) produced by a VCT tab by checking whether the signal pulse in question occurs when the crankshaft electronic signature signal (36) is high or low.

More specifically, as seen in FIG. 1b, the crankshaft electronic signal (36) is high (38) (equal to one) for one-half of a combustion cycle, and low (40) (equal to zero) for the other half of the cycle. If the VCT/CID signal pulse in question occurs when the crankshaft electronic signature signal (36) is high (38), the pulse (28, 30, 32, 34) indicates a VCT tab. If the pulse occurs when the crankshaft electronic signature signal (36) is low (40), the pulse (26) indicates the CID tab. It should be noted that, given the sensor wheel (10) geometry discussed above, the VCT signal pulses (28, 30, 32, 34) are equidistant from each other and the CID signal pulse (26) is equidistant from two VCT signal pulses (30, 32) if the engine is rotating at a fixed speed.

The required camshaft phasing is not a serious concern for 4-cylinder applications. In that regard, up to 90 degrees of relative phasing are theoretically available in a 4-cylinder engine. Software post-processing of the signal pulses (to ensure a consistently clean signal) and variable reluctance sensor technology limitations result in a loss of approximately 20-25 degrees. Nevertheless, the resulting 65-70 degrees available for relative phasing still exceed the 50-60 degrees required to produce the benefits described above.

However, for 6 and 8-cylinder engines where a single sensor wheel is to be employed, only 60 and 45 degrees of relative phasing will be available, respectively. Taking into account the 20-25 degree losses described above, only 40 and 25 degrees of relative phasing remain, respectively. This is unacceptable for most VCT engine strategies where, as previously described, 50-60 degrees are required to produce performance benefits. As a result, an alternative method is employed to deal with 6 and 8-cylinder engines. This approach trades VCT phase position update frequency for larger available phase shifting between the camshaft and crankshaft.

More specifically, a sensor wheel is constructed having only one-half the number of VCT tabs compared to the number of cylinders of the engine. The CID tab is again placed equidistant between two VCT tabs creating a 3+1 sensor wheel for a 6-cylinder engine, and a 4+1 sensor wheel for an 8-cylinder engine. Thus, sensor wheel (10) of FIG. 1 is also appropriate for use in an 8-cylinder engine.

If the engine is a V-bank configuration and the two banks have camshafts that are independently phased from the crankshaft, then an additional wheel may be added to the second bank. This creates two 3 or 4-cylinder VCT systems, although only one CID has meaning. However, if the two banks are actuated through a shared mechanical phase shifter, only one wheel is employed.

The VCT/CID distinguishment operates by counting and tracking crankshaft based combustion events. A VCT tab to VCT tab sequence of events will always occur over two combustion events. In contrast, a VCT to CID tab sequence or a CID to VCT tab sequence will always occur during a single combustion event. Regardless, the last tab type must be stored to know if a CID or VCT had previously occurred.

Because the method counts whole combustion events, this is the necessary limit of cam phasing. That is, the cam can be rotated relative to the crankshaft the number of degrees that it takes for one combustion event to occur. For 6-cylinder and 8-cylinder engines, this is 120 and 90 degrees of crank angle, respectively. Even after subtracting 20 degrees for hardware and/or software limits, this is more than enough for cam phasing in presently suggested systems.

As previously described, however, the cost is that the system receives only one cam phasing update per two combustion events for each independently operated camshaft. This acts as a control system limitation for the feedback controller that positions and regulates the cam phase.

The present invention overcomes these and other limitations of the prior art by providing the same update resolution of the above 4-cylinder system (i.e., one VCT update for each engine combustion event for each independently controlled camshaft). The present invention also provides a camshaft rotational position range of one engine event (such as the 6 and 8-cylinder engines), instead of one-half an engine event (such as the 4-cylinder engines).

Still further, the present invention allows for VCT/CID distinguishment independent of crankshaft data. As a result, VCT/CID distinguishment does not require adjustment for relative cam to crankshaft phase changes. It should be noted, moreover, that the present invention does not affect current methods for measuring camshaft relative phase.

Referring now to FIG. 2a, a VCT/CID sensor wheel for use in a 6-cylinder engine is shown according to the method and system of the present invention. As seen therein, sensor wheel (50) contains a single tab (52) for CID, and six other tabs (54, 56, 58, 60, 62, 64) for VCT position (one for each cylinder). A pickup sensor (66) and a circuit/microprocessor (68) produce a signal pulse for each pass of CID tab (52) and a VCT tab (54, 56, 58, 60, 62, 64). In that regard, sensor wheel (50) and pickup sensor (66) act as a VCT/CID signal generator for generating a plurality of signal pulses including a signal pulse which identifies an engine cylinder and a signal pulse for each one of the plurality of engine combustion events.

Once again, VCT tabs (54, 56, 58, 60, 62, 64) are spaced equidistant from each other. In contrast to the prior art, however, rather than being located equidistant between two VCT tabs (54, 56), CID tab (52) is located as close as possible to a VCT tab (54) without introducing electronic detection errors by sensor pickup (66) and circuit/microprocessor (68). That is, CID and VCT tabs (52, 54) must be machined with enough precision to still provide the VCT control system accurate feedback error information concerning cam phasing.

In that regard, the closer CID tab (52) is to VCT tab (54), the greater engine accelerations the detection scheme (discussed in detail below) can tolerate. In the preferred embodiment, the distance between CID tab (52) and VCT tab (56) is at least four times the distance between CID tab (52) and VCT tab (54). Such spacing is sufficient to accommodate the doubling/halving of engine acceleration discussed below, and therefore any normal engine acceleration conditions. Moreover, it should be noted that while sensor pickup (66) may be a variable reluctance sensor well known in the art, it is preferably a Hall effect sensor to minimize detection errors given the proximity of CID tab (52) to VCT tab (54).

Referring next to FIG. 2b, a graphical representation is shown of a VCT/CID signal pulse train produced by sensor wheel (50). As seen therein, a VCT signal pulse (70, 72, 74, 76, 78, 80) is produced over time for every 60 degrees (i.e., 6-cylinder engine) of camshaft rotation. In addition, a single CID signal pulse (82) is produced for each camshaft revolution. As before, given the sensor wheel (10) geometry discussed above, the VCT signal pulses (28, 30, 32, 34) are equidistant from each other if the engine is rotating at a fixed speed. Given the spacing of CID tab (52) to VCT tab (54) on sensor wheel (50), the CID signal pulse (82) is closely associated in time with one VCT signal pulse (74).

In general, the present invention takes advantage of the limits of the rate of change of the elapsed time between two engine combustion events. This time varies in inverse proportion to the rotational speed of the engine, which cannot change (i.e., the engine cannot accelerate) instantaneously.

In fact, it is generally assumed that the time from one engine combustion event to the next cannot shrink more than 50% nor grow more than 200% of the preceding time. If the VCT tabs (54) are equally spaced, but a CID tab (52) is placed between them, a check can be made based on the preceding time when a new tab in question interrupts the microprocessor software. If insufficient time has elapsed for the tab to be a VCT tab (54), then the tab is identified as a CID tab (52). In such a fashion, the present invention allows a new CID pulse for each full engine cycle (720 degrees of the crankshaft), just as previous systems have been required to do.

More specifically, the algorithm for distinguishing between VCT and CID signal pulses (70, 72, 74, 76, 78, 80, 82) may be represented as follows:

```
if
    LAST_TIME_BETWEEN_TABS >=
        (Multiplier) × PRESENT_TIME_BETWEEN_TABS;
then
    CID_TAB_FLAG = 1; (CID tab, not VCT tab)
else
    CID_TAB_FLAG = 0; (VCT tab, not CID tab)
endif
```

It should be noted that this algorithm is preferably performed by circuit/microprocessor (68) once appropriately programmed. However, those of ordinary skill in the art will recognize that this algorithm may also be performed by any equivalent thereof. In that regard, circuit/microprocessor (68) or any equivalent thereof acts as a controller for measuring time periods between signal pulses and determining whether a signal pulse is a CID or VCT signal pulse based on comparisons of such time periods.

Referring again to FIG. 2b, operation of the above algorithm may be explained in greater detail. In that regard, the present invention measures the time between each pair of adjacent signal pulses (70, 72, 74, 76, 78, 80, 82). In a first example, at time $T_0$, the time period $t_1$ between signal pulses (72, 74) is compared to the scaled time period $t_2$ between signal pulses (74, 82). Since $t_1$ is greater than or equal to scaled $t_2$, signal pulse (82) is identified as representing CID tab (52) (see FIG. 2a). In another example, at time $T_1$, the time period $t_2$ between signal pulses (74, 82) is compared to the time period $t_3$ between signal pulses (82, 76). Since $t_2$ is not greater than or equal to scaled $t_3$, signal pulse (76) is identified as representing a VCT tab (56) (see FIG. 2a).

In a still further example, at time $T_2$, the time period $t_4$ between signal pulses (76, 78) is compared to the time period $t_5$ between signal pulses (78, 80). Since $t_4$ is not greater than or equal to scaled $t_5$, signal pulse (80) is identified as representing a VCT tab (60) (see FIG. 2a). It should be noted that the multiplier (or scale factor) and the wheel tab geometry can be adjusted to provide the maximum allowed acceleration and deceleration. Again, the relative distance of a VCT to CID tab must also take into account microprocessor interrupt limitations and electronic sensor signal processing time. The multiplier should be greater than 2 and less than 5 to deal with the doubling/halving of engine acceleration previously discussed. While the most robust value is 3.5 (the average of the two limits), the multiplier may be rounded to an integer value of 4 for ease of calculations.

Referring next to FIGS. 3a–d, graphical representations are shown of the present invention in operation for simulated steady state engine speed, maximum allowed acceleration, and maximum allowed deceleration conditions. More specifically, FIG. 3a portrays a camshaft sensor wheel trace (CID_VCT) for an 8-cylinder engine using an 8+1 wheel and a single phase shifter.

The CID_VCT pulse train can be separated into five sections. Each section is a complete VCT/CID signature of one camshaft revolution (2 crankshaft revolutions) which is composed of 8 equally spaced VCT tabs and one CID tab placed at 20% of the VCT to VCT spacing distance. The pulse widths are electronically processed signals, though their relative width is still a function of sensor to tab surface speed (slower wheel speed results in longer pulse widths).

The first two sections of the CID_VCT trace represent an engine speed of 2400 RPM. The third section represents 1200 RPM. The fourth and fifth sections represent 2400 RPM. Overall, the trace depicts a steady state engine speed condition (the juncture of the first and second and fourth and fifth sections), a severe deceleration (the juncture between the second and third sections), and a severe acceleration (the juncture between the third and fourth sections). The logic that checks the elapsed tab to tab times uses relative ratios (instead of absolute time) so the change from 2400 to 1200 and back to 2400 RPM is representative for any engine speed that halves or doubles in the time of one combustion event.

The traces of FIGS. 3b (pulse delta time) and 3c (change in time) show intermediate processing values. Pulse delta time portrays the accumulation of time from each tab to tab sequence. Change in time portrays the difference in time between successive pulse deltas. The trace of FIG. 3d (cid_tab_flag) shows the output of the algorithm. Once engine revolution is underway, CID tabs are properly detected. As there is no previous pulse with which to compare, the very first CID tab is not recognized. Current VCT strategies deal with this by locking the VCT phase shifter until the system is initialized.

As those of ordinary skill in the art will recognize, the trace of FIG. 3a portrays engine speed transitions that are very severe. As a result, the traces of FIGS. 3b–d, are simplified versions of the true nature of the pulse train that the VCT/CID sensor wheel will produce in normal operation. In FIG. 3a, the VCT tab pulses occur at even intervals from one another in a given section. In reality, engine speed changes will result in pulse occurrences that will vary in time, even for a single section (i.e., camshaft revolution). The actual combustion-to-combustion time changes are less severe for a given change in overall engine cycle time (2 crankshaft revolutions).

Referring finally to FIGS. 4a–d, graphical representations are shown of the present invention for a severely rolling engine speed. The trace of FIG. 4a (rpm) is slightly more severe than normal engine roll. As seen therein, engine speed varies from 500 to 1500 rpm in the space of 0.1 seconds. This overly dramatic roll was chosen to recreate the doubling/halving per section transition that was discussed with respect to FIGS. 3a–d. The same algorithm is applied to this more typical VCT/CID camshaft input. The CID is correctly identified for each camshaft revolution.

More specifically, FIG. 4b again portrays a camshaft sensor wheel trace (VCT CID sig), this time for a 6-cylinder engine using an 6+1 wheel and a single phase shifter. The trace of FIGS. 4c (pulse delta time) again shows the accumulation of time from each tab to tab sequence. Finally, the trace of FIG. 4d (cid_tab_flag) again shows the output of the algorithm. Once the present invention is initialized, CID tabs are properly detected.

As is readily apparent from the foregoing description, then, the present invention provides an improved method and system for distinguishing a VCT tab from a CID tab that avoids the range and position information limitations of the prior art. More specifically, the present invention provides a method and system for distinguishing VCT tabs from a CID tab without relying on a direct comparison of the crankshaft signature signal. Instead, the method and system employ signal pulses from a newly designed sensor wheel mounted to an engine camshaft. Based on the physical limitations of an engine to accelerate or decelerate at a maximum rate due to its inertia, VCT and CID tabs can be distinguished by the relative time between pulses.

It is to be understood that the present invention has been described in an illustrative manner and that the terminology which has been used is intended to be in the nature of words of description rather than of limitation. As previously stated, many modifications and variations of the present invention are possible in light of the above teachings. Therefore, it is also to be understood that, within the scope of the following claims, the invention may be practiced otherwise than as specifically described herein.

What is claimed is:

1. A method for distinguishing a cylinder identification signal pulse from a plurality of camshaft timing signal pulses in a variable cam timing engine having a plurality of engine combustion events, the method comprising:

generating a plurality of signal pulses, including a signal pulse which identifies an engine cylinder and a signal pulse for each one of the plurality of engine combustion events, wherein generating a plurality of signal pulses includes providing a single sensor wheel having a plurality of tabs including a tab which identifies an engine cylinder and a tab for each one of the plurality of engine combustion events, the cylinder identification tab positioned between adjacent first and second engine combustion event tabs, the cylinder identification tab having a first distance to the first engine combustion event tab and a second distance to the second engine combustion event tab, the second distance being greater than the first distance;

measuring a first time period between a first signal pulse and a second signal pulse;

measuring a second time period between the second signal pulse and a third signal pulse; and determining that the third signal pulse is the cylinder identification signal pulse if a product of the second time period and a scaling factor fails to exceed the first time period.

2. The method of claim 1 further comprising determining that the third signal pulse is a camshaft timing signal pulse if the product of the second time period and a scaling factor exceeds the first time period.

3. The method of claim 1 wherein the scaling factor has a value between two and five.

4. The method of claim 3 wherein the scaling factor has a value of 3.5.

5. The method of claim 3 wherein the scaling factor has a value of four.

6. The method of claim 2 wherein the cylinder identification tab is positioned between a first tab for one of the plurality of engine combustion events and a second tab for another of the plurality of engine combustion events, the cylinder identification tab having a first distance to the first tab and a second distance to the second tab, the second distance being at least four times the first distance.

7. The method of claim 6 wherein the cylinder identification tab is positioned as close as possible to the first tab for one of the plurality of engine combustion events without interference with sensing passage of each of the plurality of tabs.

8. The method of claim 6 wherein the scaling factor has a value between two and five, the value depending on the first distance between the cylinder identification tab and the first tab for one of the plurality of combustion events.

9. A system for distinguishing a cylinder identification (CID) signal pulse from a plurality of camshaft timing signal pulses in a variable cam timing (VCT) engine having a plurality of engine combustion events, the system comprising:

A VCT/CID signal generator for generating a plurality of signal pulses including a signal pulse which identifies an engine cylinder and a signal pulse for each one of the plurality of engine combustion events, the VCT/CID signal generator including a single sensor wheel having a plurality of tabs including a tab which identifies an engine cylinder and a tab for each one of the plurality of engine combustion events, the cylinder identification tab positioned between adjacent first and second engine combustion event tabs, the cylinder identification tab having a first distance to the first engine combustion event tab and a second distance to the second engine combustion event tab wherein the second distance is greater than the first distance; and a controller for measuring a first time period between a first signal pulse and a second signal pulse, measuring a second time period between the second signal pulse and a third signal pulse, and determining that the third signal pulse is the cylinder identification signal pulse if a product of the second time period and a scaling factor fails to exceed the first time period.

10. The system of claim 9 wherein the controller further determines that the third signal pulse is a camshaft timing signal pulse if the product of the second time period and a scaling factor exceeds the first time period.

11. The system of claim 9 wherein the scaling factor has a value between two and five.

12. The system of claim 11 wherein the scaling factor has a value of 3.5.

13. The system of claim 11 wherein the scaling factor has a value of four.

14. The system of claim 10 wherein the cylinder identification tab is positioned between a first tab for one of the plurality of engine combustion events and a second tab for another of the plurality of engine combustion events, the cylinder identification tab having a first distance to the first tab and a second distance to the second tab, the second distance being at least four times the first distance.

15. The system of claim 14 wherein the cylinder identification tab is positioned as close as possible to the first tab for one of the plurality of engine combustion events without interference with sensing passage of each of the plurality of tabs.

16. The system of claim 14 wherein the scaling factor has a value between two and five, the value depending on the first distance between the cylinder identification tab and the first tab for one of the plurality of combustion events.

* * * * *